April 5, 1960
A. MARZOCCHI ET AL  2,931,739
PLASTICS AND LAMINATES FORMED OF
GLASS FIBERS AND EPOXY RESINS
Filed Oct. 8, 1956
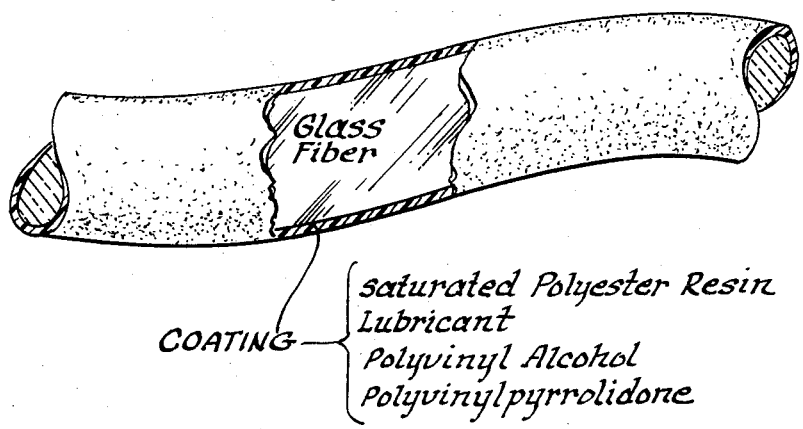
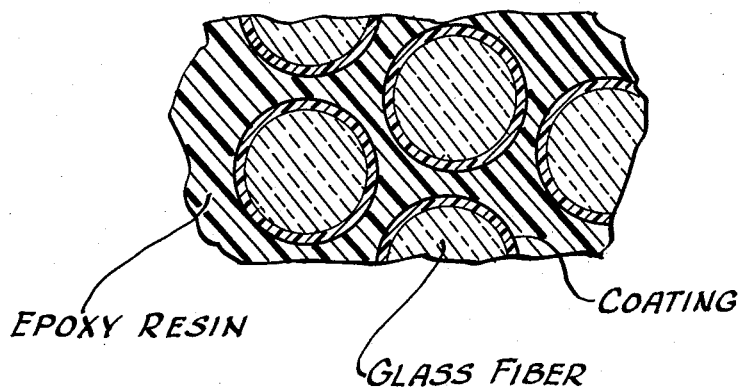
INVENTORS.
Alfred Marzocchi
BY Nicholas S. Janetos
Staelin + Overman
Attorneys

United States Patent Office 2,931,739
Patented Apr. 5, 1960

2,931,739

PLASTICS AND LAMINATES FORMED OF GLASS FIBERS AND EPOXY RESINS

Alfred Marzocchi, Pawtucket, and Nicholas S. Janetos, Providence, R.I., assignors to Owens-Corning Fiberglas Corporation, a corporation of Delaware Application October 8, 1956, Serial No. 614,367

14 Claims. (Cl. 117—126)

This invention relates to the manufacture of glass fiber reinforced plastics and laminates and it relates more particularly to plastics or laminates formed of epoxy type resinous materials and to glass fibers coated with a material that improves the processing characteristics of the glass fibers in strand, yarn, roving and fabric formation and the performance characteristics of the glass fibers in use as a reinforcement for the epoxy and the like resinous materials in the manufacture of plastics, laminates and coated fabrics.

Glass fibers have been recognized in the art of plastics, laminates and coated fabrics as an ideal material for use as a reinforcement, strengthening and flexibilizing agent in combination with resinous materials employed in the manufacture of such glass fiber reinforced plastics, laminates and coated fabrics. Because of the inability to achieve a strong physical bond between the resinous materials and the perfectly smooth, non-porous glass fibers and because of the inability to achieve a strong bonding relationship between the organic resinous materials and the hydrophilic, resinophilic surfaces of the glass fibers, full utilization of the reinforcing and strengthening properties of the glass fibers is incapable of being achieved unless supplemental means are employed for improving the bonding relationship between the resinous materials of the plastics or laminates and the surfaces of the glass fibers and unless such means remain effective even under wet or high humidity conditions.

Various agents have been applied to glass fiber surfaces for the purpose of improving the anchorage of resinous materials. With resinous materials formed by polymerization with monomers containing an ethylenic or acetylenic unsaturation, use as an anchoring agent has been made of Werner complex compounds having a carboxylato group coordinated with the trivalent nuclear chromium atom containing less than 8 carbon atoms and formed with an unsaturated ethylenic linkage. Such materials are defined in the issued Steinman Patent No. 2,552,910 and as represented by the compound methacrylato chromic chloride. Use as an anchoring agent has also been made of unsaturated organo-silicon compounds as defined in the issued Biefeld Patent No. 2,683,097 and as represented by vinyltrichlorosilane, the corresponding silanols and the corresponding polysiloxanes that are formed thereof. The theory underlying the use of such materials resides in the ability of these compounds to wet out and to be come attached to the glass fiber surfaces through the trivalent nuclear chromium atom of the Werner complex or the silicon atom of the organo-silicon compound. The ethylenic unsaturation in the short chained organic groups attached to the trivalent nuclear chromium atom of the Werner complex or the silicon atom of the organo-silicon compound is receptive to the resinous materials formed by addition polymerization to tie in the resinous materials with the glass fiber surfaces.

Such anchoring agents, based upon ethylenic unsaturation are not effective for use with resinous materials formed by condensation polymerization as represented by phenol formaldehyde resins, urea formaldehyde resins, melamine formaldehyde resins, polyester resins, and the like. For such combinations it has been found desirable to make use of Werner complex compounds or organo-silicon compounds for attachment to the glass fiber surfaces in the manner previously described but in which the organic group coordinated with the trivalent nuclear chromium atom of the complex or attached directly to the silicon atom of the organo-silicon compound contains a free hydroxy, amino, or carboxy group capable of condensation reaction with hydroxy, amino, carboxy or methylol groups of the resin forming materials. Reference may be had to the copending application of Biefeld et al., Ser. No. 325,898, filed December 13, 1952, for a description of the materials and methods of the type described for improving the bonding relationship between glass fiber surfaces and resinous materials which are formed by condensation polymerization.

Such anchoring agents are ordinarily applied to the glass fiber surfaces which have been freed of any other coatings so as to enable the anchoring agent to secure the desired attachment to groupings available on the surfaces of the glass fibers. Since such anchoring agents are incapable of protecting the glass fibers from destruction by mutual abrasion, it is desirable to apply the anchoring agent to the glass fiber surfaces for modification of the properties of the glass fibers at a time when little, if any, further processing of the glass fibers will be required prior to the combination with the resinous materials in the manufacture of the plastic, laminate, or coated fabric. Thus, when the glass fibers are employed as a reinforcement in the form of a yarn, roving or a woven or non-woven fabric, it is desirable to size the glass fibers in forming with a conventional size composition and then remove the size from the glass fiber surfaces after the fibers have been processed to the form desired for use as a reinforcement and before application to coat the fibers with the anchoring agent.

Application of a size composition in forming, its subsequent removal, as by washing or burning, followed by the application of the desired anchoring agent adds materially to the cost of the fiber reinforcement and other products which are fabricated therewith. Of more importance even is the recognition that the anchoring agents previously employed have been found to be incapable of making maximum utilization of the strength and flexibilizing properties of the glass fibers, yarns and fabrics when used as a reinforcement in combination with the epoxy type resinous materials. Thus, it is an object of this invention to produce and to provide a method for producing glass fibers, yarns, rovings and fabrics having the glass fiber surfaces modified by a coating composition which wets out the glass fiber surfaces and improves the bonding relationship between the glass fiber surfaces and epoxy resinous materials such as are used in combinations therewith in the manufacture of glass fiber reinforced plastics, laminates and coated fabrics, and it is a related object to provide a new and improved glass fiber reinforced epoxy resinous product and a method for the manufacture of same.

Another object is to produce and to provide a method for producing glass fibers, yarns, rovings and fabrics in which the glass fibers are sized in forming with a composition that protects the glass fibers for processing and which operates on the glass fiber surfaces to improve the bonding relationship between the glass fibers and epoxy resins employed in combinations therewith thereby to produce coated glass fibers as fibers or in the form of yarns, rovings and fabrics having improved processing and performance characteristics.

These and other objects and advantages of this invention will hereinafter appear and for purposes of illustration, but not of limitation, an embodiment of the invention is shown in the accompanying drawing in which—

Figure 1 is a perspective elevational view partially in section of a glass fiber processed in accordance with the practice of this invention, and Figure 2 is a sectional view through a laminate formed in accordance with the practice of this invention.

We have succeeded in the formulation of a composition that can be applied in forming or afterwards to glass fibers as a size to protect the glass fibers and to provide the desired balance between lubricity and bonding for enabling the glass fibers to be processed into strands, yarns, rovings and woven or non-woven fabrics. The same composition can be applied to glass fibers, yarns or fabrics as an anchoring agent which is effective markedly to improve the bonding relationship between the treated glass fibers and epoxy type resinous materials thereby to improve the performance characteristics of the glass fibers as a reinforcement, strengthening or flexibilizing agent in plastics, laminates or coated fabrics formed thereof. The ability of making simultaneous use of the composition both as an anchoring agent and as a size eliminates the multiple steps and compositions heretofore required for sizing the glass fibers with one composition followed by the steps of removing the size and coating the fibers with another composition for use as an anchoring agent after the fibers have been processed to the form desired for combination as a reinforcement with epoxy resins.

The following is given as representative of a composition embodying the features of this invention, its preparation and its application to glass fibers for use of the glass fibers in combination with epoxy resins in the manufacture of glass fiber reinforced plastics, laminates or coated fabrics:

EXAMPLE 1

Treating composition 3.0 percent by weight saturated polyester resin
0.1 percent by weight polyvinyl alcohol
0.1 percent by weight wetting agent (lauric acid amide reacted with 16 mols of ethylene oxide—Nopcogen 16L)
0.5 percent by weight polyvinyl pyrrolidone
0.3 percent by weight $\gamma$-aminopropyltriethoxysilane
Glacial acetic acid in amount sufficient to adjust the composition to a pH of $4.5 \pm .5$
Remainder water

Procedure

Stock solutions can be prepared in advance of the polyvinyl alcohol and polyvinyl pyrrolidone by addition to water in an amount to form about a 5 percent solution. Because of the difficulties in dissolving the materials in water, it is preferred to add the resinous material slowly in finely divided form to cold water with stirring followed by heating the mixture to about 60° C. with continued stirring until solution is completed.

In formulating the treating composition, the saturated polyester is introduced into a steam jacketed kettle with a wetting agent and with the steam turned on to heat the material to about 80° C. for melting. If desirable, an amount of toluene to form 1 percent by weight of the treating composition can be added to the materials in the kettle to accelerate solution and to stabilize the composition.

The polyvinyl alcohol is added in the desired amount from stock solution and the water is introduced in an amount corresponding to twice the volume of resin accompanied with rapid agitation. Agitation for this purpose can be carried out with an Eppenbach mixer to form an emulsified system which thickens at first and then thins out as the water is added.

In the main tank, the silane is added to about one-half of the remaining water after the water has been acidified, as by acetic acid, succinic acid, or the like. First the resin emulsion is added and then the stock solution of pyrrolidone is added followed by the addition of the remainder of water. The final mixture is adjusted with acid or base to a pH of about $4.5 \pm .5$. In the preferred practice, the treating composition is homogenized at 200 pounds per square inch pressure by passing it from the main mixing tank through a two-stage homogenizer to a storage tank for use. The composition should be retained at a maximum temperature of 27° C. and a minimum temperature of 10° C. for stability.

Application

When applied to the glass fibers in forming, the treating composition is applied as by means of a roller coater or wiper pad onto the continuous glass fibers as they are gathered together to form a strand. The strands of coated glass fibers are wound about a rapidly rotating drum which operates rapidly to attenuate the hundreds of molten streams of glass issuing from the bushing from the underside of a glass melting furnace. When applied separate and apart from formation of the fibers, the treating composition is applied to the glass fiber surfaces after the fibers have been processed to the form desired for use in the combination with the epoxy resin. Any size previously applied to the glass fiber surfaces for processing is removed as by means of a wash or by burning the size from the glass fiber surfaces. Thus the treating composition can be applied to the individual glass fiber filaments in forming or onto glass fibers in the form of strands, yarns, rovings, or woven or non-woven fabrics.

For application, it is desirable to make use of a composition in which the solids are present in an amount within the range of 3.0 to 4.0 percent by weight although use can be made of a 1 to 7 percent by weight treating composition for use as a size and anchoring agent. The coating weight, based upon the amount of solids, applied to the glass fiber surfaces should range from 0.5 to 1.0 percent by weight in the preferred concept or from 0.2 to 2.0 percent by weight, in the broader concept.

As the saturated polyester, use can be made of alkyd type resinous materials formed by condensation reaction of saturated dihydric alcohols, such as ethylene glycol, propylene glycol and the like with saturated dibasic acids, such as phthalic acid, isophthalic acid, succinic acid and the like. Representative is a saturated polyester prepared by condensation reaction of propylene glycol, succinic acid, and phthalic anhydride, as manufactured by the Glidden Company under the trade names GRV–2172 and GRV–3056, or a condensation reaction product of propylene glycol, succinic acid and isophthalic acid, as manufactured by the Glidden Company under the trade names GRV–3048 and GRV–3072, and other Glidden saturated polyesters and the like.

Instead of the described polyesters, use can be made of other film forming materials which are compatible with epoxy resins. For example, use can be made of epoxy resins of "Epons" such as are formed by the reaction of bisphenol and epichlorohydrins, including catalyzed curable Epon resins such as are manufactured by the Shell Chemical Company under the trade name Shell 562 and Shell 828 and the like epoxy resins, such as are manufactured by the Bakelite Division of Carbide-Carbon Chemical Company, Ciba Company and the like. Use can be made of epoxy resinous material such as a self-curable modified epoxy resin of the type manufactured under the trade name "Becco A–$_{10}$–15–35" or a catalyzed curable epoxy resin such as is marketed under the trade name "Becco A–$_{10}$–15–50," or an aliphatic modified epoxy resin such as is marketed under the trade name "Araldite 297," or use can be made of a vinylpyrrolidone-vinyl acetate copolymer.

While a saturated polyester resinous material is preferred as the film forming resinous component which is compatible with the epoxy resinous binders used in the manufacture of glass fiber reinforced plastics and laminates, the saturated polyester in Example 1 can be replaced in whole or in part with a flexible unsaturated polyester resin such as is formed by condensation reaction of an unsaturated dibasic acid, such as maleic anhydride, with a glycol, as manufactured by Rohm and Haas under the trade name Paraplex P-13 and Paraplex AP-48, and the like, or use can be made of flexible unsaturated polyesters formed by condensation reaction of an oil fatty acid, such as linseed fatty acid, with a glycol, as manufactured by Glidden Company under the trade name Glidpol 2001 and Glidpol 2002 and the like, or a polyester formed by condensation reaction of a long chain linseed oil and phthalic acid as manufactured under the trade name Aroplaz 1400.

In the preferred practice of this invention, the composition is formulated with the polyester resinous component present in an amount within the range of 3.0 to 3.5 percent by weight of the treating composition. However, the polyester resinous material and the other materials substitutable therefor can be present in the treating composition in an amount ranging from 2 to 10 percent by weight.

The polyvinyl alcohol component operates in the treating composition to stabilize the emulsion of the polyester resinous component and to minimize the amount of emulsifying agent required. While polyvinyl alcohols of a fairly wide range can be used, it is desirable to make use of a polymer within the range of Elvanol 52-20 to 52-40. The polyvinyl alcohol component can be replaced in whole or in part with a polyvinyl acetate hydrolyzed sufficiently to provide for the desired degree of water solubility. The polyvinyl alcohol component may be employed in the treating composition in an amount within the range of 0.1 to 2.0 percent by weight but it is preferred to make use of an amount within the range of 0.1 to 0.15 percent by weight.

The Nopcogen 16L, in Example 1, is a cationic surface active agent which comprises the reaction product of a diamine, ethylene oxide and lauric acid. Instead of Nopcogen 16L, use can be made in Example 1 of the nonionic surface acid oxyethylene alcohols such as octylphenylpolyoxyethylene alcohols marketed under the trade name "Triton X-114," "Triton X-100" and "Triton X-45." Use can be made of Carbowax stearates which are the polyethylene glycol stearates or polyethylene glycol palmitates and the like. Instead of the above, use can be made of the reaction product of tetraethylene pentamine with epichlorohydrin and stearic acid or other fatty acid, or of sorbitan mono-oleate polyoxyalkylene derivatives marketed under the trade name "Tween," such as "Tween 81."

Unlike many of the other surface active agents used for the preparation of emulsions, the foregoing components are capable of supplying the dual properties, in a composition of the type described, of emulsification and lubrication to reduce tackiness and minimize drag on the treated threads of glass fibers. While other emulsifying agents tend to interfere with the establishment of a strong bonding relation between the resin and glass fibers, agents of the type described are capable of emulsification without deteriorating effect on the glass-resin bond strength.

The amount of emulsifying agent in the treating composition is not critical. One-tenth of 1 percent is sufficient to give the desired results and an amount as great as 1 percent may be used but it is preferred to make use of the lubricant-emulsifier in an amount within the range of 0.1 to 0.2 percent by weight of the treating composition.

The gamma amino propyl triethoxy silane in Example 1 can be replaced, in whole or in part, with other organo-silicon compounds preferably having an organic group attached directly to the silicon atom in which the organic group contains less than 8 carbon atoms in aliphatic arrangement and which contains an ethylenic unsaturation. Such other organo-silicon compounds may be represented by vinyltriacetoxysilane, vinyltrichlorosilane, vinyltri(betamethoxy)ethoxysilane, allyldichlorosilane, allyltrichlorosilane, and the water soluble alkai metal salts of the corresponding silanols, such as the sodium salt of vinylsilanol and the like. Use can also be made of epoxy stearate silane or a reaction product of vinylallylsilane, vinyltrichlorosilane and resorcinol.

The organo-silicon compound in an amount within the range of 0.2 to 3.0 percent by weight of the treating composition can be employed but it is preferred to make use of this component within the range of 0.3 to 1.0 percent by weight of the treating composition.

The amount of polyvinylpyrrolidone in the treating composition can range from 0.3 to 2.5 percent by weight but it is preferred to make use of an amount within the range of 0.5 to 0.8 percent by weight of the treating composition. Though not equivalent, the vinylpyrrolidone can be replaced in the treating composition with a corresponding amount of a polyethylene glycol (Carbowax) or a polyvinyl methyl ether maleic anhydride condensation reaction product or a cationic amine compound such as tetraethylenepentamine, diallylmelamine or unquaternized polyamides such as marketed by Quaker Chemical Products Corporation under the trade name "Quaker X-1209" or quaternary derivatives of polyimidazoline, such as marketed under the trade name "Quaker X-1160." The polyvinylpyrrolidone component appears to function in the treating composition as a stiffener and in the improvement of the characteristics of the roving that is formed.

In addition to the materials formulated into the treating composition, as represented in Example 1, use can be made of a water repellent, such as a stearato chromic chloride or other Werner complex compound having a carboxylato group coordinated with the trivalent nuclear chromium atom in which the carboxylato group is formulated to contain more than 10 carbon atoms. Use can also be made of stearyl silicon (diethyl ethanolamino hydrochloride)$_3$ and other similar fatty acid silicon salts. The amount of water repellent can vary from 0.1 to 2.0 percent by weight but it is preferred to make use of an amount within the range of 0.5 to 1.0 percent by weight of the treating composition.

EXAMPLE 2

2.0–5.0 percent by weight saturated polyester resin
0.1–2.0 percent by weight polyvinyl alcohol
0.1–1.0 percent by weight emulsifier-lubricant
0.2–3.0 percent by weight organo-silicon compound
0.3–2.5 percent by weight polyvinylpyrrolidone
0.1–2.0 percent by weight water repellent

EXAMPLE 3

| Specific | Range |
| --- | --- |
| 3.0 | 2.0–4.0 percent by weight saturated polyester resin. |
| 0.5 | 0.5–0.8 percent by weight polyvinylpyrrolidone. |
| 0.3 | 0.3–1.0 percent by weight vinyltrichlorosilane. |
| 0.1 | 0.05–0.1 percent by weight polyvinyl alcohol. |
| 0.1 | 0.1–1.0 percent by weight surface active agent. |
| 0.5 | 0.1–2.0 percent by weight stearato chromic chloride. |

EXAMPLE 4

| Specific | Range |
| --- | --- |
| 0.3 | 2.0–4.0 percent by weight saturated polyester resin. |
| 0.5 | 0.3–0.6 percent by weight polyvinylpyrrolidone. |
| 0.3 | 0.3–0.6 percent by weight vinyltrichlorosilane. |
| 0.08 | 0.05–2.0 percent by weight acetone. |
| 0.08 | 0.05–1.0 percent by weight polyvinyl alcohol. |
| 0.15 | 0.1–0.2 percent by weight $Al_2(SO_4)_3$. |

EXAMPLE 5

- 3.5 percent by weight vinylpyrrolidone-vinyl acetate copolymer
- 0.5 percent by weight polyvinyl pyrrolidone
- 0.3 percent by weight sodium methyl polysiloxanolate
- 1.0 percent by weight toluene
- 0.2 percent by weight polyvinyl alcohol
- 0.1 percent by weight stearato chromic chloride

EXAMPLE 6

- 2.5 percent by weight epoxy resin, aliphatic modified (Araldite 297)
- 0.4 percent by weight polyvinylpyrrolidone
- 0.4 percent by weight allyldichlorosilane
- 1.0 percent by weight acetone
- 0.1 percent by weight polyvinyl alcohol In the foregoing examples, the remainder of the composition is made up of water and the composition is adjusted in pH, following mixture in the manner previously described in connection with Example 1, to a pH of about 4.5. Application of these compositions may be made to glass fibers in forming or onto glass fibers in the form of strands, yarns and fabrics after any previous coating on the glass fibers has been removed.

Size compositions for glass fibers can be formulated also of film forming materials based upon the reaction products and copolymers of polyvinylpyrrolidone with various resinous materials, lubricants, monomers and the like, as represented by the following:

In one system, polyvinylpyrrolidone is combined with polyvinylmethylether-maleic anhydride after the polyvinylmethylether has been reacted with maleic anhydride as in the presence of ammonium hydroxide. Instead of making use of maleic anhydride as the carboxylic acid, use can be made of other carboxylic acids such as phthalic acid, malic acid, fumaric acid and the like.

Instead of reacting the polyvinylpyrrolidone with polyvinylmethylether-maleic anhydride to produce a film forming material which can be used as a size composition of the type previously described in replacement for the saturated polyester and polyvinylpyrrolidone, use can be made of the reaction product of diglycol oleate, diglycol stearate, and the like polyglycol-fatty-acid salts plus polyvinylpyrrolidone. The fatty acid salt can be replaced by fatty acid amines such as stearamine, pelargonic acid amine and the like amine lubricants such as are marketed under the trade names "Duomeen 12," "Warco Amine 1" (Warwick Chemical Company), a mixture of ortho and para N-toluene sulfonamides (Santocizer 8-Monsanto Chemical Company) and such compounds as are marketed by General Aniline & Film Corporation under the trade name "Soromine AT," "Agent OCO-129" and "Agent OCO-190."

These can be formulated in amounts of from 1 to 5 percent by weight polyvinyl pyrrolidone and 0.2 to 1.0 percent by weight fatty acid glycol or amine. In preferred formulations, 2 percent polyvinylpyrrolidone is formulated with 4 percent Warco Amine #1 or 2 percent pyrrolidone can be formulated with 1 percent Duomeen and 2 percent polyvinylpyrrolidone can be formulated with 1 percent pelargonic acid amide.

In more specific formulations, 3.6 percent by weight polyvinylpyrrolidone, 2.4 percent by weight diglycol oleate and 0.92 percent by weight glass fiber lubricant were formulated in aqueous medium, for application onto glass fibers as a finish. In another formulation, 1.1 percent by weight diglycol stearate, 2.2 percent by weight diglycol oleate, 3.4 percent by weight polyvinylpyrrolidone, and 0.04 percent by weight OCO-190 (General Aniline & Film Corporation) were combined in aqueous medium for application onto glass fibers.

For use in a glass fiber size composition, the polyvinylpyrrolidone can be modified with other film forming resinous materials as represented by polyvinylacetals, polyvinylbutyrals, cellulose acetate and the like, or copolymers can be formed of vinylpyrrolidone with vinyl acetate, vinyl chloride and the like.

These modified polyvinylpyrrolidones and copolymers can be used alone in the desired amounts in a glass fiber finishing composition but it is preferred to make use of the film forming materials in combination with a glass fiber lubricant, such as the fatty acid glycols or polyglycols, fatty acid amines, and the like compounds combined with polyvinylpyrrolidone as previously described.

For copolymerization, the vinylpyrrolidone and the vinyl acetate, vinyl chloride and the like can be employed within the ratio of 20 parts by weight vinylpyrrolidone to 80 parts by weight vinyl acetate or vinyl chloride ranging to the opposite ratio of 80 parts by weight vinylpyrrolidone to 20 parts by weight vinyl acetate or vinyl chloride and the like. In practice, glass fiber treating compositions have been formulated of 2 percent by weight of the copolymer formed of 80 parts by weight vinylpyrrolidone to 20 parts by weight vinyl acetate and with 1.5 percent by weight glass fiber lubricant, all of which are combined in an aqueous treating composition. Improvement in flexure and resistance is secured by increasing the amount of acetate to vinylpyrrolidone as in the formulation of 2 percent by weight vinylpyrrolidone-vinyl acetate copolymer formed of 60 parts by weight vinylpyrrolidone and 40 parts by weight vinyl acetate in combination with 1.5 percent by weight of glass fiber lubricant, or 2 percent by weight of the copolymer formed of 40 parts by weight vinylpyrrolidone and 60 parts by weight vinyl acetate in combination with 1.5 percent by weight glass fiber lubricant. Best results were secured with a formulation composed of 2 percent by weight of the copolymer formed of 20 parts by weight vinylpyrrolidone to 80 parts by weight of vinyl acetate in combination with 1.5 percent by weight glass fiber lubricant and 6.0 percent by weight solax.

Suitable copolymers have also been prepared of vinylpyrrolidone and vinyl stearate preferably in the ratio of 3-10 parts by weight of vinyl stearate to 97-90 parts by weight vinylpyrrolidone and by the copolymerization of vinylpyrrolidone with butadiene or with ethylene in the ratio of 5-40 parts by weight of butadiene or ethylene to 95-60 parts by weight vinylpyrrolidone. These can be formulated into glass fiber treating compositions in amounts ranging from 1-7 percent by weight preferably in combination with a glass fiber lubricant of the type previously described present in an amount ranging from 0.4 to 4.0 percent by weight.

By way of still further modification, the vinylpyrrolidone component of a glass fiber finishing and size composition can be prepared as the reaction product of polyvinylpyrrolidone with alkyl substituted phenols. The reaction product can be further reacted with an aldehyde such as formaldehyde in the same ratio as is used to form resinous materials between formaldehyde and phenol. This material may be used as a film forming compound alone on in combination with glass fiber lubricants in an aqueous glass fiber treating composition.

The following examples are given by way of illustration of the further concepts of this invention in which the solids are given in percent by weight, the remainder being diluent or water.

EXAMPLE 7

| Specific | Range |
| --- | --- |
| 3.0 | 3.0–5.0 Linseed oil fatty acid-glycol condensate (Glidpol 2001). |
| 0.3 | 0.3–0.5 Vinyltrichlorosilane. |
| 0.1 | 0.1–0.2 Polyvinyl alcohol (Elvanol 52–22). |

EXAMPLE 8

| Specific | Range |
|---|---|
| 3.0 | 3.0-5.0 Flexibilized unsaturated polyester (Paraplex P-13). |
| 0.3 | 0.3-0.5 Vinyltrichlorosilane. |
| 0.1 | 0.1-0.2 Emulsifier-lubricant (Triton X100). |
| 0.5 | 0.3-0.5 Polyvinylpyrrolidone. |
| 0.1 | 0.1-0.2 Polyvinyl alcohol (Elvanol 52-22). |

EXAMPLE 9

| Specific | Range |
|---|---|
| 3.0 | 3.0-5.0 Polyvinylpyrrolidone. |
| 0.3 | 0.3-0.6 Aminopropyltriethoxysilane. |
| 2.0 | 1.0-2.0 Stearato chromic chloride (quilon). |

EXAMPLE 10

| Specific | Range |
|---|---|
| 3.0 | 3.0-5.0 Linseed oil-phthalic acid polyester (Aroplaz 1400). |
| 3.0 | 1.0-4.0 Epoxidized soya oil (G 62). |
| 0.3 | 0.3-0.6 γ-aminopropyltriethoxysilane. |
| 0.5 | 0.5-1.0 Gelatin. |
| 3.0 | 1.0-3.0 Stearato chromic chloride. |
| 0.15 | 0.1-0.2 Emulsifier-lubricant (Triton X100). |

EXAMPLE 11

| Specific | Range |
|---|---|
| 3.0 | 3.0-5.0 Saturated polyester (GRV 2172) or (GRV 3048). |
| 0.1 | 0.1-0.2 Epoxidized soya oil (G 62). |
| 0.3 | 0.3-0.6 γ-Aminopropyltriethoxysilane. |
| 0.5 | 0.5-1.0 Polyvinylpyrrolidone. |
| 0.1 | 0.1-0.2 Emulsifier-lubricant (Nopcogen 162). |
| 0.1 | 0.1-0.2 Polyvinyl alcohol (Elvanol 52-22). |

EXAMPLE 12

| Specific | Range |
|---|---|
| 3.0 | 3.0-5.0 Epoxidized soya oil (G 62). |
| 3.0 | 3.0-5.0 Long chain linseed oil-phthalic acid condensate (Aroplaz 1400). |
| 0.3 | 0.2-0.6 γ-Aminopropyltriethoxysilane. |
| 3.0 | 2.0-5.0 Stearato chromic chloride. |
| 0.5 | 0.5-1.0 Polyvinylpyrrolidone. |
| 0.15 | 0.1-0.2 Emulsifier-lubricant (Triton X100). |

As used herein the term "epoxy resins" is intended to relate to resinous materials which, in most cases, are based upon epichlorohydrin and bisphenyl A. The product contains both epoxide and hydroxyl groups capable of further reaction. It is the combination of these groupings with polyfunctional agents such as various amines, acid anhydrides, dibasic acids and resins including phenol formaldehyde resin, urea formaldehyde resin, polyamides and melamine formaldehyde resin that make possible the formation of cured resinous systems having excellent characteristics for use in combination with glass fibers in the manner herein described for the manufacture of high strength plastics and laminates. The term "epoxy resins" has acquired a distinctive and well defined meaning and classification in the art and a fuller description of epoxy resins of the type which may be employed in the practice of this invention can be found in Modern Plastics Encyclopedia, 1955 issue, pages 101-105, and the references cited therein.

Glass fibers coated with the treating compositions embodying features of this invention can be incorporated in the form of fibers, yarns, rovings, fabrics and the like with such epoxy resinous materials in amounts ranging from 1-20 percent by weight of the plastic, laminate or coated fabric that is formed thereof. When present in such amounts, the glass fibers which become strongly bonded to the resinous material through the coating on the glass fiber surfaces markedly improve the strength properties of the plastic or laminate and materially enhance the other mechanical and physical properties thereof. The applied coating functions to protect the glass fibers during processing and it functions in the combination with the epoxy resinous materials as an anchoring agent to provide a strong bonding relationship between the glass fiber surfaces and the resinous materials, even under high humidity conditions.

It will be understood that various changes may be made in the details of composition, formulation and application of the treating composition of glass fibers without departing from the spirit of the invention, especially as defined in the following claims.

We claim:

1. A laminate and plastic formed of the system consisting of an epoxy resin as the adhesive phase, glass fibers as a reinforcement and a coating on the glass fiber surfaces to improve the processing characteristics of the glass fibers and to improve the bonding relationship between the epoxy resins and the glass fiber surfaces comprising the combination of a saturated polyester resin, a polyvinyl alcohol, a glass fiber lubricant-emulsifier, an organosilicon compound and polyvinylpyrrolidone in which the materials are present in the ratio of 2.0 to 5.0 parts by weight saturated polyester resin, 0.1 to 2.0 parts by weight polyvinyl alcohol, 0.1 to 1.0 parts by weight lubricant-emulsifier, 0.2 to 3.0 parts by weight organo-silicon compound and 0.3 to 2.5 parts by weight polyvinylpyrrolidone.

2. A laminate and plastic as claimed in claim 1 in which the organo-silicon compound is a gamma amino propyltriethoxysilane.

3. A laminate and plastic as claimed in claim 1 in which the organo-silicon compound is a silane having an unsaturated short chained hydrocarbon radical attached directly to the silicon atom.

4. A laminate and plastic as claimed in claim 1 in which the lubricant-emulsifier is the reaction product of a diamine ethylene oxide and lauric acid.

5. A laminate and plastic as claimed in claim 1 in which the material is present to provide a coating weight on the glass fibers of 0.5 to 1.0 percent.

6. A laminate and plastic formed of the system consisting of an epoxy resin as the adhesive phase, glass fibers as a reinforcement and a coating on the glass fiber surfaces to improve the processing characteristics of the glass fibers and to improve the bonding relationship between the epoxy resins and the glass fiber surfaces comprising the combination of a saturated polyester resin, a polyvinyl alcohol, a glass fiber lubricant-emplsifier, an organo-silicon compound, polyvinylpyrrolidone, and a water repellent, in which the materials are present in the ratio of 2.0 to 5.0 parts by weight saturated polyester resin, 0.1 to 2.0 percent by weight polyvinyl alcohol, 0.1 to 1.0 parts by weight lubricant-emulsifier, 0.2 to 3.0 parts by weight organo-silicon compound, 0.3 to 2.5 parts by weight polyvinylpyrrolidone, and 0.1 to 2.0 parts by weight water repellent.

7. In the manufacture of plastics and laminates formed of the combination of epoxy resins and glass fibers, the improvement which comprises coating the glass fiber surfaces prior to combination with the epoxy resins with an aqueous composition containing 2.0 to 5.0 percent by weight saturated polyester resin, 0.1 to 2.0 percent by weight polyvinyl alcohol, 0.1 to 1.0 percent by weight lubricant-emulsifier, 0.2 to 3.0 percent by weight organosilicon compound and 0.3 to 2.5 percent by weight polyvinylpyrrolidone.

8. The system as claimed in claim 7 in which the organo-silicon compound is gamma amino propyltriethoxysilane.

9. The system as claimed in claim 7 in which the organo-silicon compound is formed of a silane having a short chained unsaturated hydrocarbon radical attached directly to the silicon atom and in which the silane has from 1-3 highly hydrolyzable groups.

10. The system as claimed in claim 7 in which the treating composition for the glass fibers is adjusted to a pH of 4.5±.5.

11. The system as claimed in claim 7 in which the coating composition is applied to provide a coating on the glass fiber surfaces of 0.5 to 1.0 percent by weight of the glass fibers.

12. The system as claimed in claim 7 in which the coating composition has from 1 to 5 percent by weight of an organic solvent in which the polyester is soluble.

13. In the manufacture of plastics and laminates formed of the combination of epoxy resins and glass fibers, the improvement which comprises coating the glass fiber surfaces prior to combination with the epoxy resins with an aqueous composition containing 2.0 to 5.0 percent by weight saturated polyester resin, 0.1 to 2.0 percent by weight polyvinyl alcohol, 0.1 to 1.0 percent by weight lubricant-emulsifier, 0.2 to 3.0 percent by weight organo-silicon compound, 0.3 to 2.5 percent by weight polyvinyl pyrrolidone, and 0.1 to 2.0 percent by weight water repellent.

14. In the manufacture of plastics and laminates formed of a combination of epoxy resins and glass fibers, the improvement in which the glass fibers are sized to provide a coating on the glass fiber surfaces to improve the processing characteristics of the glass fibers and to improve the anchoring relationship between the epoxy resins and the glass fibers combined therewith in which the coating consists of the combination of a saturated polyester resin, a polyvinyl alcohol, a glass fiber lubricant-emulsifier, an organo-silicon compound and polyvinylpyrrolidone in which the materials are present in the ratio of 2.0 to 5.0 percent by weight saturated polyester resin, 0.1 to 2.0 percent by weight polyvinyl alcohol, 0.1 to 1.0 percent by weight lubricant-emulsifier, 0.2 to 3.0 percent by weight organo-silicon compound and 0.3 to 2.5 percent by weight polyvinylpyrrolidone.

References Cited in the file of this patent

UNITED STATES PATENTS

| | | |
|---|---|---|
| 2,265,450 | Reppe et al. | Dec. 9, 1941 |
| 2,512,996 | Bixler | June 27, 1950 |
| 2,687,398 | McLean | Aug. 24, 1954 |
| 2,688,007 | Steinman | Aug. 31, 1954 |
| 2,695,276 | Hatcher | Nov. 23, 1954 |
| 2,744,835 | Caroselli | May 8, 1956 |
| 2,763,573 | Biefeld | Sept. 18, 1956 |
| 2,776,910 | Erickson et al. | Jan. 8, 1957 |
| 2,780,909 | Biefeld et al. | Feb. 12, 1957 |
| 2,782,131 | Johnson | Feb. 19, 1957 |

OTHER REFERENCES

Schildknecht: "Vinyl and Related Polymers," John Wiley and Sons, Inc., 1952; page 678.